US008996685B2

(12) United States Patent
Menai

(10) Patent No.: US 8,996,685 B2
(45) Date of Patent: Mar. 31, 2015

(54) MANAGEMENT OF THE DISTRIBUTION OF CONTENTS

(75) Inventor: Mohamed-Fouz Menai, Ploulec'h (FR)

(73) Assignee: Orange, Paris (FR)

( * ) Notice: Subject to any disclaimer, the term of this patent is extended or adjusted under 35 U.S.C. 154(b) by 547 days.

(21) Appl. No.: 12/935,342

(22) PCT Filed: Mar. 31, 2009

(86) PCT No.: PCT/FR2009/050542
§ 371 (c)(1),
(2), (4) Date: Sep. 29, 2010

(87) PCT Pub. No.: WO2009/125155
PCT Pub. Date: Oct. 15, 2009

(65) Prior Publication Data
US 2011/0029668 A1 Feb. 3, 2011

(30) Foreign Application Priority Data

Apr. 1, 2008 (FR) ...................................... 08 52149

(51) Int. Cl.
*G06F 15/173* (2006.01)
*H04L 29/08* (2006.01)
(Continued)

(52) U.S. Cl.
CPC ............. *H04L 67/306* (2013.01); *H04L 41/509* (2013.01); *H04L 65/1016* (2013.01); *H04L 65/4084* (2013.01)
USPC ............ 709/224; 709/226; 370/331; 370/236

(58) Field of Classification Search
CPC ..... H04L 29/06; H04L 47/10; H04L 65/4084; H04L 65/1016; H04L 41/509; H04L 67/306
USPC .......................... 709/224, 226; 370/236, 331
See application file for complete search history.

(56) References Cited

U.S. PATENT DOCUMENTS 6,763,384 B1 * 7/2004 Gupta et al. .................. 709/224
7,046,680 B1 * 5/2006 McDysan et al. ............. 370/396
(Continued)

FOREIGN PATENT DOCUMENTS

| WO | WO 02/071222 A1 | 9/2002 |
| WO | WO 2004/010266 A1 | 1/2004 |
| WO | WO 2006/023225 A1 | 3/2006 |

OTHER PUBLICATIONS

Design of Open APIs for Personalized IPTV Service, Jihye Lyu, et al. Feb. 12-14, 2007, ICACT2007.*
(Continued)

*Primary Examiner* — Saleh Najjar
*Assistant Examiner* — Oleg Korsak
(74) *Attorney, Agent, or Firm* — Drinker Biddle & Reath LLP

(57) ABSTRACT

A method of transmitting management information for entities linked to a contents distribution network comprises a registration of entities linked to the distribution network with a notification entity; a detection of at least one event by at least one entity linked to the distribution network; a transmission of information regarding detection of events by said entity linked to the distribution network to the notification entity; and a transmission of management information corresponding to said event by said notification entity to the registered entities linked to the distribution network, wherein said detection comprises the observation and the analysis of signalling messages circulating over the contents distribution network.

8 Claims, 3 Drawing Sheets

(51) Int. Cl.
*H04L 12/24* (2006.01)
*H04L 29/06* (2006.01)

(56) References Cited

U.S. PATENT DOCUMENTS 7,403,993 B2 * 7/2008 John et al. .................... 709/226
7,606,197 B2 * 10/2009 Julka et al. ................... 370/331
7,822,871 B2 * 10/2010 Stolorz et al. ................ 709/238
7,961,622 B2 * 6/2011 Russell et al. ................ 370/236
2007/0067794 A1 3/2007 Russell et al.

OTHER PUBLICATIONS

Open IPTV Forum, "Open IPTV Forum Functional Architecture—V 1.1," retrieved from internet website: http://www.openiptvforum.org/docs/OpenIPTV-Functional_Architecture-V1_1-2008-01-15_APPROVED.pdf, pp. 1-141 (Jan. 15, 2008).

* cited by examiner

MANAGEMENT OF THE DISTRIBUTION OF CONTENTS

CROSS-REFERENCE TO RELATED APPLICATIONS

This application is the U.S. national phase of the International Patent Application No. PCT/FRP2009/050542 filed Mar. 31, 2009, which claims the benefit of French Application No. 08 52149 filed Apr. 1, 2008, the entire content of which is incorporated herein by reference.

FIELD OF THE INVENTION

The present invention relates to networks for the distribution of contents and in particular audiovisual contents.

BACKGROUND

Networks for the distribution of contents, or CDN (Content Delivery Networks) are based on the use of a large number of servers, distributed over the network so as to position the contents as close as possible to users in order to minimize the use of the links and improve the file access times. Such contents distribution architectures are very widely used in open networks such as the internet but also in closed networks in which traffic parameters can be guaranteed.

The increase in the volume of contents, in particular the audiovisual contents of television programmes, results in significant problems in terms of bit rate and processing capacity. An appropriate management of the resources of the distribution networks is becoming essential, both in open networks and in closed networks. In fact, in order to ensure the quality of service of the distribution of contents, the requests originating from users must be transmitted to the most suitable distribution servers.

In order to allow efficient management, it is beneficial to monitor different elements of the network and to transmit or propagate information representing certain metrics to certain specific nodes of the network and in particular to switch nodes.

In standard fashion, a topology map of the network is defined statically or dynamically and the transmission rate of contents on different links is monitored. Thus, the distribution of contents can be organized according to the load and the transmission rate of certain links.

Patent document WO02/071222 describes a system making it possible to optimize the routing of requests in a contents distribution environment for an internet-type network. In this system, the network transmission resources are monitored and the distribution of contents is adjusted according to the transmission rates.

However, the existing solutions are only partially effective and need to be improved. In particular, the existing solutions do not allow for predictive management.

A need therefore exists to improve the situation by allowing a broadcast of information for optimized management of contents distribution networks.

SUMMARY

Embodiments of the invention responds to this need by using a method for the detection of events on a contents distribution network comprising:
  a detection of at least one event by at least one entity linked to the distribution network; and
  a transmission of information regarding detection of events by said entity linked to the distribution network to a notification entity;
  wherein said detection comprises an observation and an analysis of signalling messages flowing over the contents distribution network.

Thus, the management of the contents distribution network is based on the observation and analysis of the signalling messages making it possible to take account of the behaviours of users and, in general, carrying out a more detailed analysis than the analysis of the contents transmission flows. In certain situations, this also makes it possible to carry out a predictive analysis of the load of a contents distribution network.

In a particular embodiment, the signalling messages observed and analyzed are the messages relating to the initiation of the contents distribution sessions and to the contents delivery. In fact, these messages allow a detailed analysis of the network load.

Consequently, embodiments of the invention provide an effective adaptation to the specific needs of each entity linked to the distribution network.

Advantageously, the information is transmitted between the entities linked to the contents distribution network via notifications exchanged according to the so-called SIP protocol.

In a particular embodiment, said analysis of signalling messages comprises the application of predetermined rules in order to determine the situations in which said transmission of management information is carried out.

Advantageously, said observation comprises the observation of signalling messages flowing between users and said entities linked to the distribution network as well as the observation of signalling messages flowing between said entities linked to the distribution network.

In a particular embodiment, said detection comprises the detection of events selected from the group constituted by events relating to the load of distribution servers, events relating to the distribution of contents and events relating to the behaviour of users of the distribution network.

More specifically, the events relating to the behaviour of users comprise the frequency of repetition of the requests transmitted by these users and the comparison with thresholds applied per user as well as for groups of users.

Advantageously, the network comprises at least one distribution controller, a regional controller and a distribution server, said detection being implemented at the level of a regional controller.

The invention also relates to a method of transmitting management information for entities linked to a contents distribution network, comprising the steps of:
  the method of detection of events according to embodiments of the invention;
  registering entities linked to the distribution network with a notification entity; and
  transmitting management information corresponding to at least one event detected using said method of detection of events, by said notification entity, to the registered entities linked to the distribution network.

In a particular embodiment, said registration of entities linked to the distribution network comprises a determination of a plurality of notification parameters and said transmission of management information is carried out as a function of said notification parameters.

The invention also relates to a system, a detection device and a notification device incorporating an item of detection equipment as well as the corresponding programs.

More specifically, the invention relates to a system for transmitting management information for entities linked to a contents distribution network comprising a notification device containing in a memory a record of entities linked to the distribution network, means of detecting at least one event, incorporated into at least one entity linked to the distribution network, means of transmitting information regarding detection of events by said detection means to the notification device, and means of transmitting management information corresponding to said event by said notification device to the registered entities linked to the distribution network, wherein said detection means are suitable for the observation and analysis of signalling messages flowing over the contents distribution network.

Moreover the invention also relates to a device for the detection of events on a contents distribution network, wherein this detection device comprises means for the implementation of the method for the detection of events according to embodiments of the invention.

Such a device is incorporated into an entity linked to the contents distribution network and it is suitable for the observation and analysis of signalling messages flowing over the contents distribution network.

The invention also relates to a computer program for an entity of a contents distribution network, wherein this program consists of code instructions which, when executed by a computer of said entity, lead to the execution of the steps of the method for the detection of events according to embodiments of the invention.

Finally, the invention also relates to a computer program for a device for the notification of management information for entities linked to a contents distribution network, wherein this program consists of code instructions which, when executed by a computer of this device, lead to the registration of entities linked to the distribution network, the detection of at least one event by the observation and analysis of signalling messages of the distribution network and the transmission of management information corresponding to said event to the registered entities linked to the distribution network.

Finally, the invention also relates to a computer program for a device for the notification of management information for entities linked to a contents distribution network, wherein this program consists of code instructions which, when executed by a computer of this device, lead to the detection of events by the observation and analysis of signalling messages of the distribution network and the transmission of management information corresponding to said event to the registered entities linked to the distribution network.

BRIEF DESCRIPTION OF THE DRAWINGS

Other features and advantages of the present invention will become apparent in the non-limitative description given below, and with reference to the attached drawings, in which.

DETAILED DESCRIPTION

Embodiments of the invention will be described with reference to a closed-type contents distribution network operating according to the so-called "Open IPTV Forum" standard (www.openiptvforum.org). In this standard, three principal distribution entities are defined and placed in a hierarchy.

The first entity is the distribution controller or CDN Controller. This entity constitutes the entry point of a contents distribution network. The CDN controller receives all the requests for initiating sessions and distribution of contents. The distribution controller makes it possible to redirect these requests by carrying out a first level of analysis. In particular, the location of the user and the overall capacity of the nearby servers as a whole are taken into account. The CDN controller can also redirect the requests to other CDN controllers for reasons of load distribution.

The second entity is the regional controller, or cluster controller. This entity comprises one or more geographically-grouped servers. A second filtering of the requests originating from the CDN controllers is carried out and allows the final choice of the contents distribution server for a given request. The cluster controller also allows storage of the requests from users to the servers, in order to provide a level of traceability.

The third entity is the contents distributor or distribution server (Content Delivery Function or Basic Server). This entity fulfils the function of distribution and allows the distribution of a content following requests from users received through the cluster controller.

Figure 1:
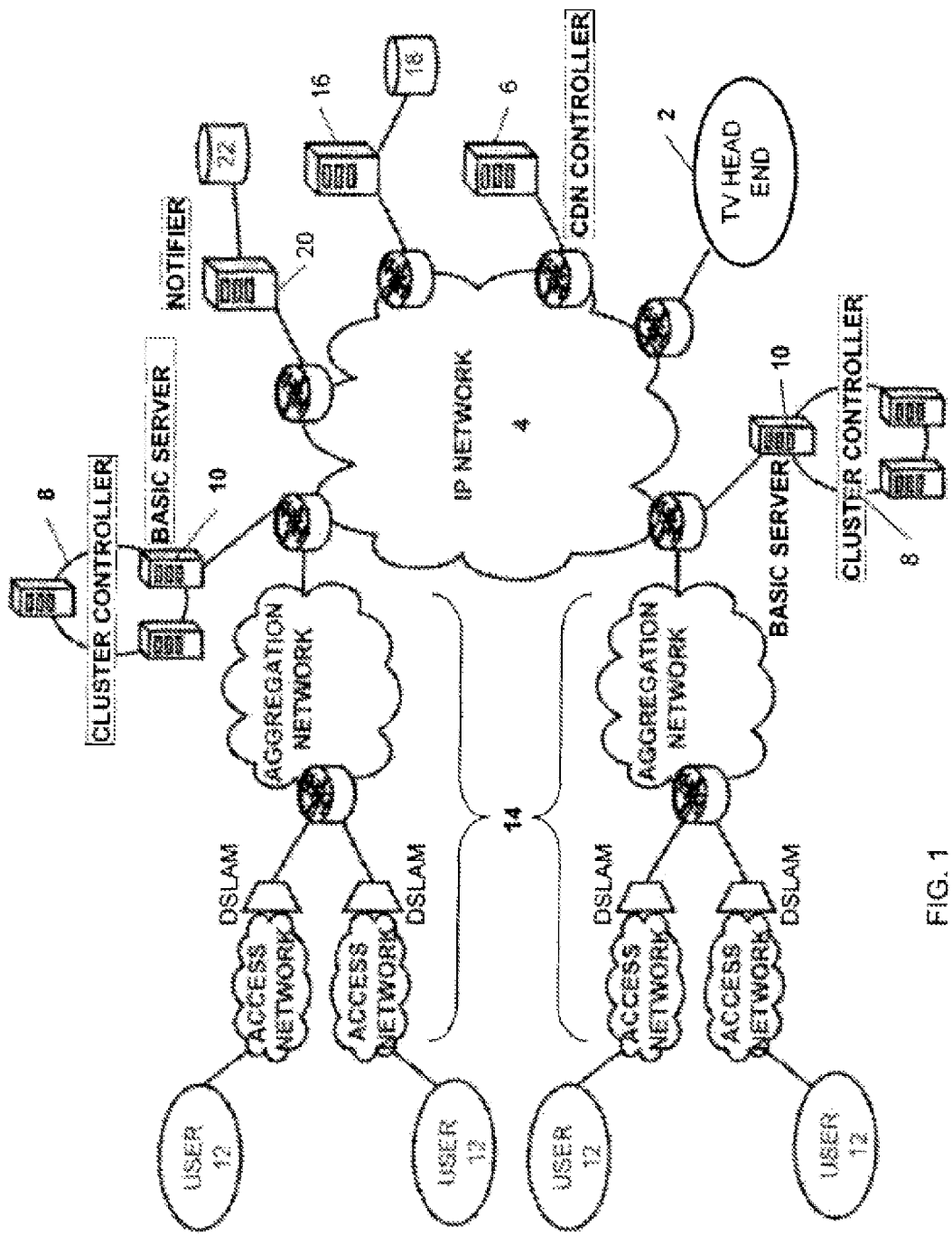
FIG. 1 is a diagram of a system implementing an embodiment of the invention.

FIG. 1 shows a network implementing such entities.

Thus, a contents provider 2, such as a television station, is connected to a contents distribution network via, for example, an IP4 network.

A CDN controller 6 and several cluster controllers 8 or regional controllers are also connected to the network 4. Each cluster controller contains contents distribution servers 10.

Users 12 are also connected to the network 4 through local or other networks, denoted generally by the reference 14.

Moreover, the system comprises a contents distribution service server 16 linked to a database of users 18. This server 16 manages the authentications, user accounts and, generally, the provision of contents distribution.

In the embodiment described, the network entities communicate by using an asynchronous protocol known by the acronym SIP (SESSION INITIATION PROTOCOL).

Such an architecture is standard and does not require description in greater detail.

Apart from these standard elements, the system implementing embodiments of the invention comprises a notification server 20 linked to the contents distribution network and associated with a database 22 encompassing notification parameters.

In general terms, the term "CDN" denotes the contents distribution network, i.e. the entities or servers which take an active part in the distribution of a content. In the example described, this involves servers 6, 8 and 10. The term "cluster" denotes a set formed of a cluster controller and associated distribution servers, i.e. the servers 8 and 10. Finally, "entity linked to the distribution network" denotes any entity involved, which includes the service server 16 or the notification server 20.

Figure 2:
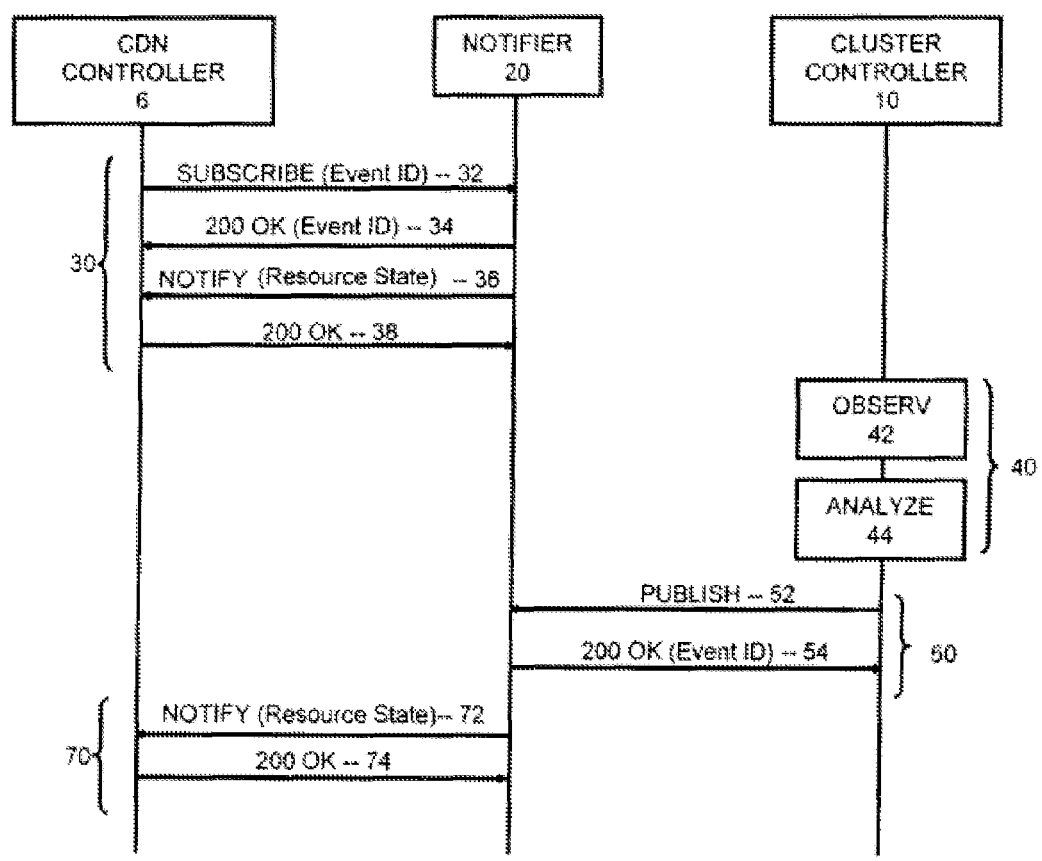
FIG. 2 is a general flowchart of a method according to an embodiment of the invention.

With reference to FIG. 2, a method according to embodiments of the invention and the functions of the notification server 20 will now be described in greater detail.

The method starts by a registration 30 of entities linked to the distribution network with the notification server 20. In the example described, this is the registration of the CDN controller 6 but the same logic is applicable to any entity linked to the distribution network.

The registration comprises a transmission 32 of a SUBSCRIBE request transmitted by the CDN controller 6 to the notification server 20. According to the SIP protocol, the server 20 transmits an acknowledgment of receipt 34 defined in the SIP specification as a 200 OK message.

Advantageously, the request 32 consists of notification parameters such as the list of the events in relation to which the CDN controller 6 requires to receive a notification or the conditions of this notification. For example, the CDN controller 6 can require to be informed asynchronously or periodically with an aggregation of the notifications or according to other specific conditions.

These notification parameters are stored in the database 22 and are used subsequently for the propagation of information in the network. The set of these parameters constitutes a "mesh" or "topology" of the information broadcast.

Advantageously, the registration 30 also comprises a transmission 36 of the current status of the resources linked to the events in relation to which the CDN controller 6 requires to receive a notification. This transmission 36 is carried out with a message of the type termed NOTIFY and the CDN controller 6 replies to this using an acknowledgement of receipt 38 of the 200 OK type.

The method then comprises an events detection 40.

This detection is based on the observation 42 and the analysis 44 of the signalling messages flowing over the contents distribution network. In fact, the existing solutions for the management of contents distribution networks are based on the analysis of the traffic and the transmission rates of the links. This therefore essentially involves observations of bit rate during the use of the links.

In the embodiment described, the detection is based on the signalling messages. These signalling messages are not specific to the detection of events but are messages exchanged between the entities within the framework of the normal operation of the contents distribution network.

By using the signalling messages, it is possible to detect events linked to the behaviours of the users. Moreover, the analysis of the signalling messages makes it possible in certain situations to anticipate events by detecting favourable conditions or warning signs. It then becomes possible to manage the CDN in a predictive manner before the appearance of the event, unlike the existing systems which monitor only the transmission of the contents.

Figure 3:
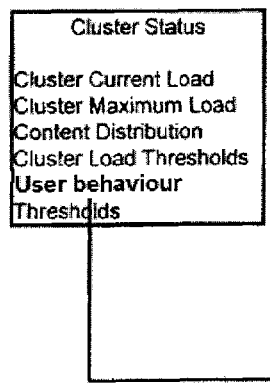
FIGS. 3 and 4 represent models of data organization.

A description will now be given, with reference to FIG. 3, of the items of information which are observed in the signalling messages, insofar as the cluster controllers are concerned.

The status of a cluster controller is determined by its current load, its maximum load and the distributed content, as well as by load thresholds and behavioural thresholds defined in relation to the user, as described in greater detail below.

This status is obtained by the analysis of information originating from each distribution server attached to the cluster controller. Among these items of information, the current load and the maximum load are significant parameters which are obtained by the analysis of the signalling messages associated with the contents delivery sessions opened on this distribution server.

In particular, for each contents delivery session the method comprises the observation, via the signalling messages, of the generic information on the session and in particular the identification of the contents delivery session and the associated SDP (SESSION DESCRIPTION PROTOCOL) provision, information on the recipient of the contents flow, i.e. the user and in particular his network address, the current activity as reflected in particular by the instructions PAUSE, PLAY or WAIT and the expiry date of the rights on the current flow. The method also comprises the observation of the information for each flow of contents of the current session and in particular the bandwidth used, the start date, an estimated end date, the ports on which the data are transmitted and received.

Among these items of information, some are static items of information defined during the configuration of the network, others are dynamic information obtained by the observation of the signalling messages.

Figure 4:
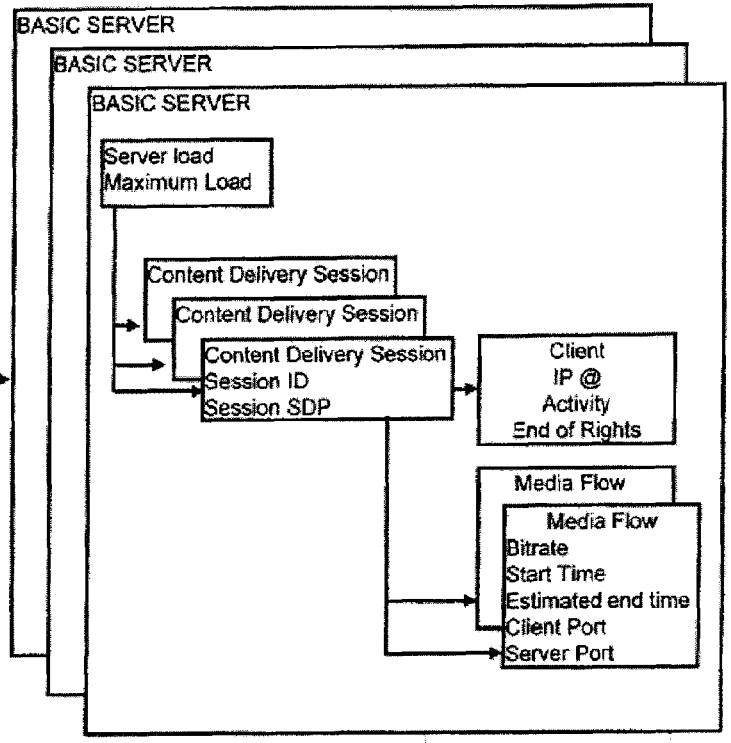
Figure 4:
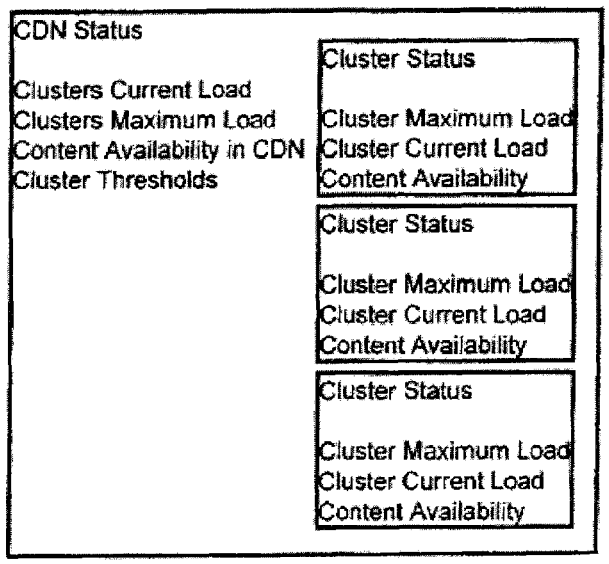

Similarly, and with reference to FIG. 4, the information observed by the method will be described, insofar as the distribution controllers or CDN controllers are concerned.

The status of the controller is determined by items of maximum load, current load, availability of the contents and load levels for each item of cluster information.

Moreover, for each cluster controller associated with a single distribution controller, the maximum load and the current load are observed, as well as the availability of certain contents.

The observation of the signalling messages is carried out at the cluster controllers which are aware of all the signalling messages passing between the users, the distribution servers and the CDN controller.

In the embodiment described, the signalling messages observed are those relating to the initiation and the delivery of contents. Of course, other signalling messages can be observed and analyzed.

The messages thus observed are then analyzed. In the embodiment described, the analysis is also carried out by the cluster controller. In other embodiments, the analysis is carried out at the notification server 20.

On the basis of the data models explained with reference to FIGS. 3 and 4, it is possible to determine events relating to the load on the contents distribution network, the distribution of contents or the behaviours of the users.

More particularly, predetermined rules are applied in order to determine the nature of the events from the signalling messages observed.

By way of example, the logic of determination of the elements from the signalling messages observed is given below.

Firstly, events relating to the load of the distribution network are explained.

The following situations make it possible to detect a cluster load change event:
  Initiation of an RTSP session following a contents distribution service request;
  Ending of an RTSP session;
  A prolonged PAUSE message from the user;
  Negative responses, or error messages following several attempts to initiate an RTSP session following a contents distribution service request;
  Absence of reaction of a distribution server following several prompts from the cluster controller during the initiation;
  Absence of reaction of a distribution server following several prompts from the user relayed by the cluster controller;
  Absence of reaction of the cluster controller following several prompts from the CDN controller;
  Receiving an event relating to a behaviour of the user.

As previously stated, the detection of these events is provided by the cluster controller. In case of absence of reaction of the cluster controller, the detection is carried out by the CDN controller.

Among the information stored, the following items of information are assigned per event:
  Contents distribution session information;
  Information on the load of the distribution server concerned;
  Cluster load information;
  CDN load information.

The entities linked to the distribution network that are capable of being affected by a notification relating to this event are the following:
- The cluster controller, in order to detect when a load level is reached;
- If applicable, the other controllers of the same cluster for the distribution of the load;
- The CDN controller in order to be informed of the cluster load.

The following situations make it possible to detect an event of change in the maximum capacity of a cluster:
- Negative responses following several attempts to initiate an RTSP session following a contents distribution service request;
- Absence of reaction of the distribution server following several prompts from the cluster controller during the initiation;
- Absence of reaction of the distribution server following several prompts from the user relayed by the cluster controller;
- Absence of reaction of the cluster controller following several prompts from the CDN controller.

As previously stated, the detection is then provided by the cluster controller or by the CDN controller in the case of absence of reaction of the cluster controller.

Among the information stored, the following items of information are assigned per event:
- Contents distribution session information;
- Information on the capacity of the distribution server concerned, considering the current load as maximum;
- Cluster capacity information;
- CDN capacity information.

The entities linked to the distribution network that are capable of being affected by a notification relating to this event are the following:
- The cluster controller, in order to detect when a capacity level is reached;
- If applicable, the other controllers of the same cluster for the distribution of the load;

Receiving a message of change of the capacity of a cluster makes it possible to detect a CDN load change event.

In this case the detection is provided by the CDN controller and the current load information of the CDN is assigned.

The entities linked to the distribution network that are capable of being affected by a notification relating to this event are the following:
- Another CDN controller managing the same CDN or another CDN;
- The entities supplying a contents distribution service and having the choice between several CDNs.

Receiving a cluster capacity change message makes it possible to detect a change in the capacity of a CDN.

The detection is provided by the CDN controller and the capacity information of the CDN is assigned.

The entities linked to the distribution network that are capable of being affected by a notification relating to this event are the following:
- Another CDN controller managing the same CDN or another CDN;
- The entities supplying a contents distribution service and having the choice between several CDNs.

Receiving a message of change of the load of a cluster and comparing this load with levels makes it possible to detect when load levels have been reached and/or exceeded by a cluster.

The detection of such an event is provided by the cluster controller. This does not assign any of the items of information in the data model described previously but can assign the policy of determination of the clusters used.

The cluster controllers as well as the CDN controllers are capable of being affected by a notification relating to this event.

Receiving a message of the change of the capacity of a cluster and comparing this load with levels makes it possible to detect when load levels have been reached and/or exceeded by a CDN. Moreover, it is possible to provide specific messages for when a cluster reaches a load level. This assigns the items of information on the current load in the data model described previously and makes it possible to detect the event. Consequently, the policy of determination of the clusters used is assigned.

The detection of these events is thus provided by the CDN controller.

The entities linked to the distribution network that are capable of being affected by a notification relating to this event are the following:
- Another CDN controller managing the same CDN or another CDN;
- The entities supplying a contents distribution service and having the choice between several CDNs.

Apart from the cluster load change events, it is also possible to determine events relating to the distribution of contents of the CDN.

The following situations make it possible to detect a change in the distribution of contents of a cluster:
- Negative responses following several attempts to initiate an RTSP session following a contents distribution service request;
- Absence of reaction of the distribution server following several prompts from the cluster controller during the initiation;
- Absence of reaction of the distribution server following several prompts from the user relayed by the cluster controller;

These events are detected by the cluster controller and, among the information stored, the following items of information are assigned per event:
- Distribution of contents in the cluster;
- Availability of contents in the cluster;
- Availability of contents in the CDN.

The entities linked to the distribution network that are capable of being affected by a notification relating to this event are the following:
- If applicable, the other cluster controllers of the same cluster in order to provide the distribution of the load;
- The CDN controller in order to update an item of information on availability of contents in the cluster;
- A management entity allowing the organization of the distribution of contents in the cluster.

The detection of a change in the availability of contents of a CDN is provided by receiving a message bearing on such a change by the CDN controller. The stored information on the availability of contents is assigned by this event.

The entities linked to the distribution network that are capable of being affected by a notification relating to this event are the following:
- Another CDN controller managing the same CDN or another CDN;
- The service entities, in particular if a content becomes unavailable;
- A management entity allowing the organization of the distribution of contents in the CDN.

Finally, it is also possible to determine events relating to a behaviour of the user.

The repetition of PLAY messages by a single user beyond a determined level is detected by the cluster controller. This repetition potentially reflects a malfunction of the distribution server and can lead to a change in the policy of choice of contents servers of the cluster. This can also reflect a security attack.

The same logic can be applied to the detection, by the cluster controller, of the repetition of PLAY messages beyond a level and by a number of users greater than a given threshold.

The entities linked to the distribution network that are capable of being affected by a notification relating to these events are the following:
  Cluster controller;
  Service entity for providing a return of information to the user;
  Security policy management entity.

Moreover, it is possible to detect at the cluster controller an event relating to an instance of exceeding content user rights in the following situations in particular:
  PLAY message received after the expiry of the rights;
  PAUSE message received when the remaining duration of the content is equal to the remaining time of the viewing rights.

The information on the content distribution session is assigned in consequence.

The entities linked to the distribution network that are capable of being affected by a notification relating to this event are the following:
  Service entity, in particular for offering a further service to the user, sending him a return message or extending his rights;
  Entity for managing the viewing rights.

Of course, the above-mentioned situations and events can be combined, and other situations and events can be envisaged.

After step 40, the method thus provides an event obtained as a result of the observation and analysis of the signalling messages flowing over the contents distribution network.

Next, the method comprises a transmission 50 of the events information to the notification server 20 by the entity which detected this event, i.e. in the example described, by the cluster controller. This transmission 50 implements a PUBLISH type message transmitted during a step 52.

According to the embodiments, the events information comprises a simple descriptor of the event or more detailed items of management information, such as for example, an identifier of a replacement server in case of overload of a given server.

The notification server accepts receipt of this events information during a step 54.

The notification server 20 then begins a transmission 70 of management information corresponding to said event to different entities of the contents distribution network.

This transmission comprises, in the example, a NOTIFY 72 message, receipt of which is accepted by an acknowledgement of receipt 74.

The notification server thus transmits to the entities linked to the distribution network concerned, an item of management information corresponding to the event detected by the observation of the signalling messages.

As for the transmission 52, the information transmitted can be simple descriptors of the event or more detailed management information.

Of course, the transmission 70 of management information is carried out by applying transmission parameters determined during the registration 30.

In particular, management information relative to certain events can be propagated to certain entities linked to the distribution network and not to others. For example, events modifying the load or the capacity of a cluster or information on the availability of contents are transmitted by the cluster controller to the other cluster controllers as well as to the CDN controller and to the entity providing the contents distribution service. Conversely, elements relating to the behaviours of users are not necessarily transmitted to the CDN controller but can be transmitted to the cluster controller and to a security entity.

As can be seen, this method is applicable equally to open or closed networks and allows an optimization based on the behaviour of the user, a notification mechanism, and on the observation of the signalling messages.

Moreover, the analysis of the events on the basis of the signalling messages makes it possible to manage the contents distribution network in a predictive manner.

Of course, embodiments other than the described embodiment can also be envisaged. In particular, it is possible to combine the notification server with another entity of the network and in particular with a cluster controller. It is also possible to incorporate the detection function within the notification server.

The functions of detection and notification can be implemented by computer programs for the entities of a contents distribution network. These programs comprise code instructions for the implementation of the method as described previously.

The invention claimed is:

1. A method of transmitting management information for entities linked to a contents distribution network comprising:
  registering entities linked to the distribution network with a notification entity, each entity being registered by way of a request comprising notification parameters such as a list of events in relation to which the entity is required to receive notification;
  detecting at least one event by at least one entity linked to the distribution network, wherein said detecting comprises observing and analyzing signaling messages flowing over the contents distribution network;
  transmitting information regarding detection of events by said at least one entity linked to the distribution network to a notification entity; and
  transmitting management information corresponding to at least one event detected using said method of detection of events, by said notification entity to the registered entities linked to the distribution network which require to receive a notification in relation to said detected event by applying the notification parameters determined during the registration and based on respective categories of said registered entities, each registered entity belonging to one of the following categories:
    a cluster controller;
    a service entity;
    a security policy management entity;
    a management entity;
    a content delivery network controller; and
    an entity supplying a contents distribution service.

2. The method according to claim 1, wherein said analysis of signaling messages comprises applying predetermined rules in order to determine the situations in which said transmission of information regarding detection of events is carried out.

3. The method according to claim 1, wherein said observation comprises observing signaling messages flowing between users and said entities linked to the distribution network as well as observing signaling messages flowing between said entities linked to the distribution network.

4. The method according to claim 3, wherein said detection comprises detecting events selected from the group consisting of events relating to the load of distribution servers, events relating to the distribution of contents, and events relating to the behavior of users of the contents distribution network.

5. The method according to claim 1, wherein said registration of entities linked to the distribution network comprises:
   determining a plurality of notification parameters; and
   determining said transmission of management information as a function of said notification parameters.

6. A non-transitory computer program product for a notification entity of a contents distribution network, comprising a computer usable medium having computer readable program code instructions embodied thereon which, when executed by a computer of said entity, said code instructions implement a method of transmitting management information for entities linked to the contents distribution network, the method comprising:
   registering entities linked to the distribution network, each entity being registered by way of a request comprising notification parameters such as a list of events in relation to which the entity is required to receive notification;
   analyzing signaling messages of the distribution network; and
   transmitting management information corresponding to an event detected by a detection entity to the registered entities linked to the distribution network which require to receive a notification in relation to said detected event by applying the notification parameters determined during the registration and based on respective categories of said registered entities, each registered entity belonging to one of the following categories: a cluster controller; a service entity; a security policy management entity; a management entity; a content delivery network controller; and an entity supplying a contents distribution service, upon reception of event detection information from said detection entity.

7. A device for the notification of information for the management of the entities linked to a contents distribution network comprising:
   means for registering entities to be notified, each entity being registered by way of a request comprising notification parameters such as a list of events in relation to which the entity is required to receive notification; and
   means for transmitting management information corresponding to an event detected by a detection entity to the registered entities which require to receive a notification in relation to said detected event by applying the notification parameters determined during the registration and based on respective categories of said registered entities, each registered entity belonging to one of the following categories: a cluster controller; a service entity; a security policy management entity; a management entity; a content delivery network controller; and an entity supplying a contents distribution service, upon reception of event detection information from the detection entity.

8. A system for transmitting management information for entities linked to a contents distribution network comprising:
   a notification device comprising a memory, wherein the memory stores a registration of entities linked to the distribution network to be notified, each entity being registered by way of a request comprising notification parameters such as a list of events in relation to which the entity is required to receive notification;
   means for detecting at least one event, incorporated into at least one entity linked to the distribution network, said means are suitable for observing and analyzing signaling messages flowing over the contents distribution network;
   means for transmitting information regarding detection of events by said detection means to the notification device; and
   means for transmitting management information corresponding to said event by said notification device to the registered entities linked to the distribution network which require to receive a notification in relation to said detected event by applying the notification parameters determined during the registration and based on respective categories of said registered entities, each registered entity belonging to one of the following categories:
   a cluster controller;
   a service entity;
   a security policy management entity;
   a management entity;
   a content delivery network controller; and
   an entity supplying a contents distribution service.

* * * * *